Figure 1:
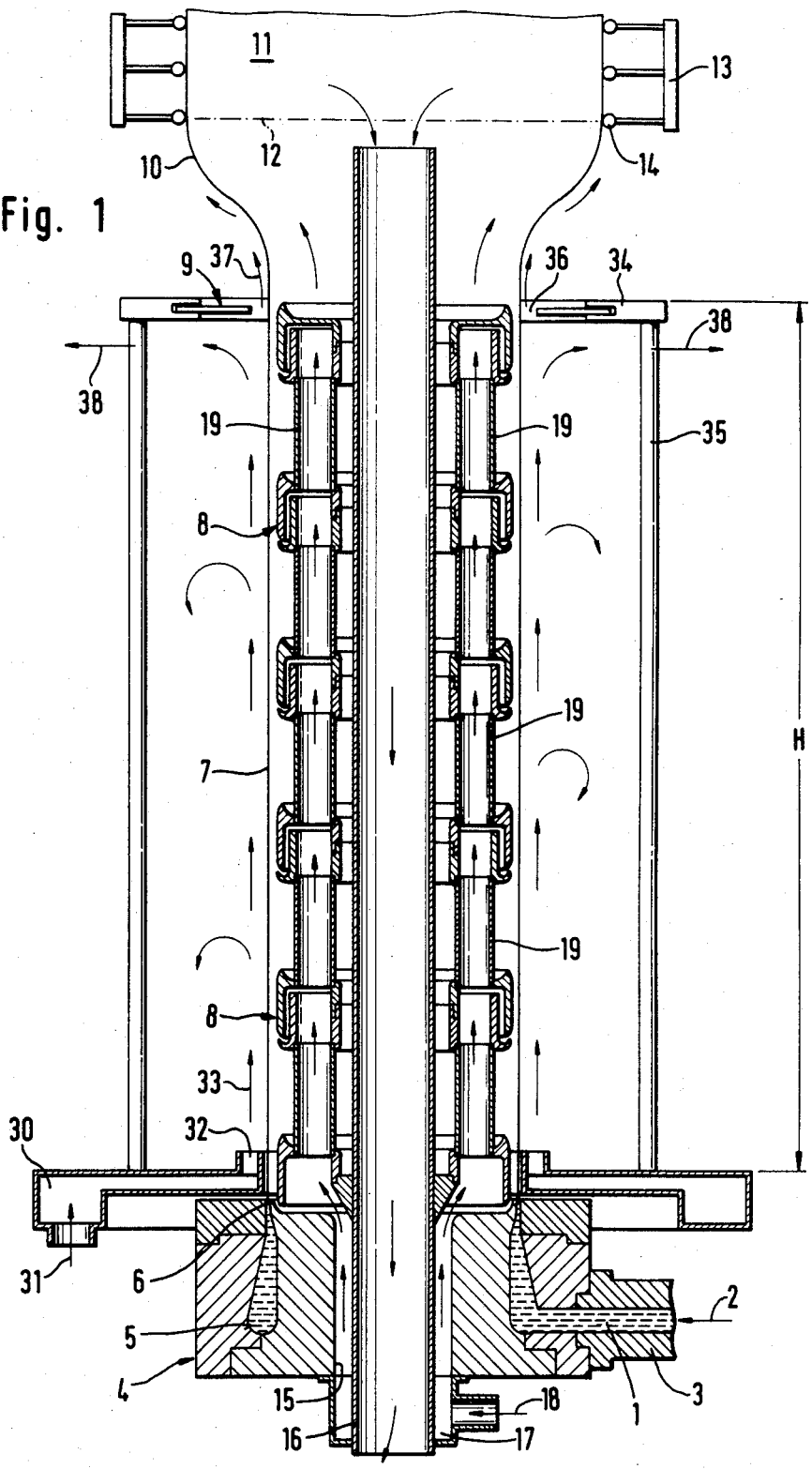

United States Patent [19]

Upmeier

[11] Patent Number: 4,601,649

[45] Date of Patent: Jul. 22, 1986

[54] COOLING APPARATUS FOR TUBULAR PLASTICS FILM EXTRUDED FROM A FILM BLOW HEAD

[75] Inventor: Hartmüt Upmeier, Lengerich, Fed. Rep. of Germany

[73] Assignee: Windmoller & Holscher, Lengerich, Fed. Rep. of Germany

[21] Appl. No.: 655,725

[22] Filed: Sep. 28, 1984

[30] Foreign Application Priority Data

Sep. 29, 1983 [DE] Fed. Rep. of Germany ....... 3335334

[51] Int. Cl.⁴ ...................... B29C 55/28; B29C 47/88
[52] U.S. Cl. .................... 425/72 R; 425/326.1
[58] Field of Search ........................ 425/72 R, 326.1

[56] References Cited

U.S. PATENT DOCUMENTS

| | | | |
|---|---|---|---|
| 3,456,044 | 7/1969 | Pahlke | 425/326.1 |
| 3,852,392 | 12/1974 | Davis et al. | 425/326.1 |
| 3,898,028 | 8/1975 | Upmeier | 425/326.1 |
| 3,902,832 | 9/1975 | Gregory et al. | 425/72 R |
| 4,019,843 | 4/1977 | Zimmerman | 425/72 R |
| 4,080,143 | 3/1978 | Upmeier | 425/72 R |
| 4,105,380 | 8/1978 | Zimmerman | 425/72 R |
| 4,243,363 | 1/1981 | Mulcahy | 425/72 R |
| 4,402,656 | 9/1983 | Schott | 425/72 R |
| 4,473,527 | 9/1984 | Fujisaki et al. | 425/326.1 |

FOREIGN PATENT DOCUMENTS

| | | | |
|---|---|---|---|
| 0127565 | 12/1984 | European Pat. Off. | 425/326.1 |
| 3311932 | 10/1984 | Fed. Rep. of Germany . | |
| 0004433 | 1/1981 | Japan | 425/72 R |

*Primary Examiner*—Willard E. Hoag
*Attorney, Agent, or Firm*—Fleit, Jacobson, Cohn & Price

[57] ABSTRACT

Cooling apparatus for tubular plastics film extruded from a film blow head includes an outer cooling ring which surrounds the extruded tubular film and defines an annular nozzle gap with a blowing direction substantially parallel to the wall of the tubular film. Near the end of a cooling section formed by an inner cooling ring beneath the inflated region of tubular film, there is an apertured baffle plate or diaphragm of which the axial projection onto the film bubble covers at least its interior inflated region and, together with the wall of the tubular film, bounds an annular gap.

8 Claims, 2 Drawing Figures

COOLING APPARATUS FOR TUBULAR PLASTICS FILM EXTRUDED FROM A FILM BLOW HEAD

The invention relates to a cooling apparatus for tubular plastic films extruded from a film blow head, comprising air cooling consisting of co-axial tubes passing axially through the film blow head to supply the cooling and inflating air and withdraw same from the film bubble. Spaced inner cooling rings are disposed substantially concentrically to the axis of the extruded tubular film downstream of the extruding ring nozzle of the blow head. The inner cooling rings have air guide surfaces which face the wall of the tube, are convex in longitudinal section of the rings and are swept by the plastic cooling air blown out of annular nozzle gaps formed by rings which are so arranged upstream of the inner cooling rings, as viewed in the direction of flow of the cooling air, that the cooling air blown out of these nozzle gaps is substantially parallel or acutely angled to the direction in which the wall of the tubular film moves.

Thin blown films of polyethylene of high density having a paper-like character are made in film blowing installations in that the extruded tubular film, after passing through a cooling section in which it has a shape resembling the neck of a bottle with a diameter corresponding to the annular nozzle gap, is inflated to a film bubble with a diameter about four times the diameter of the nozzle gap of the annular extruding ring. By reason of inflation of the tubular film to form a film bubble with an inflation ratio of about 1:4, stretching of the film in its longitudinal and transverse direction considerably increases the strength of the film. As such blown films are made, stretching of the as yet plastic tubular film in the longitudinal direction first of all takes place in the zone of the narrow neck of the film. As soon as the tubular film has reached an adequate strength as a result of cooling, it is stretched transversely in a short goblet-shaped transition zone to the diameter of the film bubble, thereby achieving a considerable increase in strength even in the case of very thin films.

It has been found that in blown films of polyethylene of low and elevated density a hitherto unheard of increase in strength can be achieved if the extruded tubular film is elongated in the longitudinal direction over the length of the cooling section in which it has the aforementioned shape of a bottle neck and is subsequently inflated at a large inflation ratio to form a film bubble.

However, to enable the extruded tubular film to be inflated to a film bubble with the desired large inflation ratio to achieve the desired increase in strength, it is necessary to employ extruding ring nozzles with nozzle gaps of a correspondingly reduced diameter. But if the diameter of the nozzle gap and thus the diameter of the extruded tubular film is reduced, only a reduced amount of heat can be withdrawn therefrom in the region of its bottle neck shape by way of the otherwise very effective internal cooling apparatus. Accordingly, the desired large inflation ratio can be achieved only if the cooling effect in the region of the bottle neck can be increased below the film bubble.

A cooling apparatus of the aforementioned kind known from prior patent application No. P 33 11 932.5-16, which is not a prior publication, facilitates a considerable increase in the cooling effect because, over the cooling section formed by the inner cooling rings where the tubular film substantially retains the diameter of the extruding ring nozzle, the film so stabilised by the suction effect produced by the convex air guide surfaces that, despite an increased throughput of cooling air, harmful vibrations are avoided in the tubular film. Despite the increased cooling effect achievable with the known cooling apparatus, a still better cooling effect is desired to enable the tubular film to be inflated with a large inflation ratio to form a film bubble after passing through the cooling section. This additional cooling effect can only be achieved with the aid of additional external cooling of the tubular film but this is either very expensive or would have to consist of a stream of blown air that might damage the sensitive film bubble.

It is therefore, an object of the invention to improve the previously described cooling apparatus with simple means in such a way that, without harm to the film bubble, so much cooling of the tubular film can be achieved over the length of the cooling section formed by the inner cooling rings that the tubular film can be inflated to a film bubble with a large inflating ratio subsequent to this cooling section.

According to the invention, this problem is solved in that the zone adjoining the extruding ring nozzle contains an outer cooling ring which surrounds the extruded tubular film and has an annular nozzle gap with a blowing direction substantially parallel to the wall of the tubular film, and that near the end of the cooling section formed by the inner cooling ring beneath the inflated region of the tubular film there is an apertured baffle plate or screen of which the axial projection onto the film bubble covers at least its interior inflated region and, together with the wall of the tubular film, define an annular gap. In the cooling apparatus of the invention, the superposed inner cooling rings with convex air guide surfaces stabilise the tubular film so well in the region of its bottle neck shape that it can be impinged from the outside with a sharp cylindrically enveloping cooling air jet which necessarily creates turbulence. Destruction of the film bubble by this sharp cooling air jet is prevented by the baffle plate or screen which deflects part of the external cooling air jet radially outwardly and thereby protects the film bubble. The annular gap formed between the edge of the aperture in the baffle plate or screen and the tubular film is so dimensioned that only an air jet of reduced energy can pass therethrough to contribute to further cooling of the tubular film in the inflated region. The air jet is throttled in the annular gap and simultaneously smoothed so that it will only cool the film bubble without damaging same.

To set the optimum conditions, the aperture diameter of the baffle plate or screen may be variable. Desirably, the baffle plate or screen consists of a iris diaphragm of which the aperture diameter is variable without steps.

To adapt the inflated region, the diaphragm or baffle plate is preferably adjustable for height in the axial direction of the film neck. The diaphragm or baffle plate is preferably arranged at the elevation of the uppermost inner cooling ring.

Figure 2:
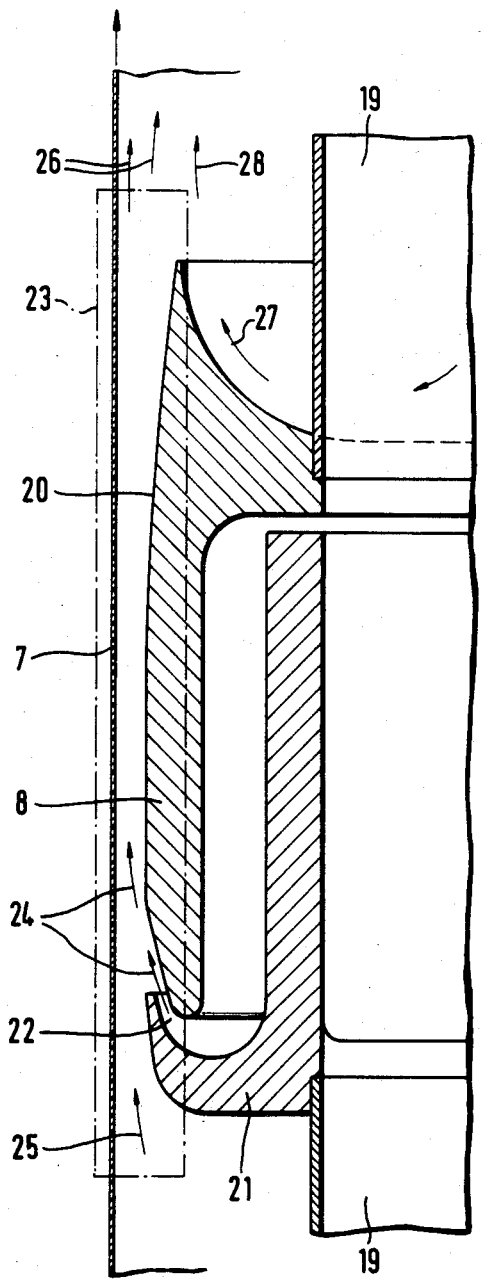

One example of the invention will now be described with reference to the drawing, wherein FIG. 1 is a longitudinal section through the film blow head and the cooling apparatus; and FIG. 2 is a enlarged longitudinal section through an inner cooling ring.

The plastics melt 1 is introduced laterally in the direction of the arrow 2 by an extruder (not shown) by way of the connecting flange 3 into the blow head housing 4 having an annular passage 5 for the melt, and that can be constructed in the manner known from DE-PS No. 20 09 914. The nozzle gap 6 of the film blow head forms the tubular film 7 which retains its cylindrical shape over the height of at least 5 times the diameter of the annular gap 6 without enlargement. In the vicinity of the uppermost cooling ring 8, the tubular film 7 passes through the aperture defined by the iris diaphragm 9 and is subsequently stretched to the full diameter of the film bubble 11 in the short radial expansion zone 10. The tubular film now inflated to form the film bubble 11 is subsequently flattened, withdrawn and coiled.

The film calibrating apparatus 13 with supporting elements 14 is arranged at the level of the film solidification line 12 at the outside of the film bubble 11.

At the centre of the laterally fed film blow head 4, there is a large aperture 15 which, together with the outlet tube 16, defines the concentric annular passage 17 into which cooling air is blown in the direction of the arrow 18 by a fan (not shown). The cooling air passes from the annular passage 17 through guide tubes 19 into the diagramatically indicated inner cooling rings 8 which are superposed at a spacing from each other and interconnected by the tubes 19. The inner cooling rings 8 have aerodynamically shaped external air guide surfaces so that they exert a radially inwardly directed suction effect on the soft plastic tubular film 7. The formation of the individual inner cooling rings eight will be evident from FIG. 2.

The inner cooling ring 8 shown part in part longitudinal section in FIG. 2 has on the side facing the inner wall of the extruded tubular film 7 a convex air guide surface 20 in the form of the suction side of an aircraft wing. Upstream of the cooling ring 8 as viewed in the direction of cooling air flow there is an inner tubular member having a radially projecting collar with an axially projecting annular lip 21 which overlaps the upstream end of the coding ring 8 and together with it forms an annular gap 22 which points in the flow direction of the air guide surface 20 of cooling ring 8 to permit flow therefrom of air in the form of a supporting ring of air and therefore subtends an acute angle with the wall of the film 7. The cooling zone of the cooling ring 8 and annular lip 21 is indicated by the chain-dotted boundary line 23 and the cooling ring 8 and slat-like ring 21 substantially corresponds in shape to the surface of an aircraft supporting wing with a Junkers slat.

The main stream of air is blown out of the gap 22 between the axially projecting annular lip 21 and the air guide ring 8 and, by reason of the suction effect produced by its high velocity, has a stabilising effect on the tubular film 7 to be cooled. In relation to the tubular film 7, the cooling ring 8 with axially projecting annular lip 21 has an overall shape resembling an annular wing.

The injector effect of the air jet 24 sucks in an additional air stream 25 around the axially projecting annular lip 21 to assist cooling and the flow of air.

According to the basic supporting wing principle, the cooling air leaves the cooling ring 8 at the end of the air guide surface 20 with a negligible amount of turbulence in the direction of the arrow 26, the supporting surface-shaped underside deflecting the air 27, which is under suction in the flow direction, without eddying, whereafter it flows as an air jet 28 in the direction of the cooling air.

External cooling of the film is effected by the outer cooling ring 30, into which outer cooling air is introduced in the direction of the arrow 31 by a fan (not shown). This outer cooling air leaves the outer cooling ring 30 through the outlet gap 32 with upright outlet lips in the form of a sharp air jet 33 which is concentric and axially parallel to the cylindrical tubular film 7.

At the level of the uppermost inner cooling ring 8, there is the mounting 34 for the iris diaphragm 9 which is supported on the outer cooling ring 30 by bolts 35 or the like. The aperture defined by the iris diaphragm 9 bounds opposite the narrow neck of the tubular film an annular passage 36 through which the residual stream 37 of outer cooling air passes and cools the tubular film in the region of the expansion zone 10. The main amount of outer cooling air 33 is diverted radially outwardly in the direction of the arrows 38 by the iris diaphragm 9.

After passing the inner cooling rings 8, the heated inner cooling air enters the tubular film bubble 11 and is sucked out as heated air through the central tube 16 by means of a fan (not shown) to increase the cooling effect.

Upon starting the blown film installation, the iris diaphragm may be fully opened to thread through the leading end of the tubular film. Depending on the output of the extruder or the take-off speed of the film, the iris diaphragm is closed to an extent such that an adequate amount of cooling air can pass through the annular gap 36 to cool the expansion zone 10. To adapt the iris diaphragm to different output take-off speeds, its height above the nozzle gap 6 can also be varied.

The illustrated cooling apparatus facilitates the use of an outer cooling ring with a high-speed stream of cooling air leaving same to be blown along the long narrow neck of the film. Despite turbulence, this sharp outer cooling air jet will not tend to damage the as yet soft plastic tubular film because the latter is stabilised by the specially shaped superposed inner cooling rings which exert thereon a radially inwardly directed suction effect.

The sharp jet of blown air from the external cooling ring will not tend to damage the film bubble 11 because it impinges on the iris diaphragm 9 which deflects the main stream outwardly and only allows a residual amount of air to pass through annular passage 36 for cooling purposes.

I claim:

1. A cooling apparatus for tubular plastics films extruded from a film blow head, comprising: air cooling means including coaxial tubes passing axially through a film blow head to supply cooling and inflating air and to withdraw same from a film bubble; a plurality of axially spaced inner cooling rings disposed substantially concentrically to the axis of the extruded tubular film downstream of an extruding ring nozzle of the blow head, the inner cooling rings having air guide surfaces which face the inner surface of the film tube and are convex in longitudinal section of the rings, each of the cooling rings including annular nozzle gaps formed by annular tubular members each having a radially projecting collar with an axially projecting annular lip and which are positioned upstream of the inner cooling rings as viewed in the direction of flow of the cooling air to define an annular gap with the respective cooling ring so that cooling air blown out of the annular gaps has a component of flow in the direction in which the wall of the tubular film moves; and outer cooling ring surrounding the extruded tubular film and having an annular nozzle gap oriented in a blowing direction substantially parallel to the outer surface of the tubular film; and an apertured baffle plate having an axial projection onto an enlarged diameter film bubble formed from the tubular film, which axial projection covers at least the interior inflated region of the film bubble, said baffle plate defining an annular gap with the outer surface of the tubular film, said apertured baffle plate positioned downstream from said outer cooling ring and upstream of and adjacent to the film bubble to control the volume of flow of external cooling air that impinges on the enlarged diameter film bubble.

2. Cooling apparatus according to claim 1, wherein the diameter of the aperture in the baffle plate is variable.

3. Cooling apparatus according to claim 2, wherein the baffle plate includes an iris diaphragm.

4. Cooling apparatus according to claim 1, wherein the spacing of the baffle plate from the extruding ring nozzle is adjustable in the axial direction of the tubular film.

5. Cooling apparatus according to claim 1, wherein the baffle plate is positioned at the level of the uppermost inner cooling ring.

6. Cooling apparatus according to claim 1, wherein the baffle plate is spaced from and supported on the outer cooling ring by vertical supports.

7. Cooling apparatus according to claim 1, wherein the length of the cooling section is 5 to 10 times the diameter of the extruding ring nozzle.

8. Cooling apparatus according to claim 1, wherein the film blow head includes a lateral melt supply port.

* * * * *